Oct. 6, 1964   J. J. BLACKMORE ETAL   3,151,961
VORTEX-TYPE DE-AERATOR AND STRAINER
Filed Jan. 9, 1961

TO DISTRIBUTION SYSTEM ←

←FROM HEAT EXCHANGER

INVENTORS
JOSEPH J. BLACKMORE and
PERRY G. GLUNT
BY
*Jerome A. Gross*
THEIR ATTORNEY

3,151,961
VORTEX-TYPE DE-AERATOR AND STRAINER
Joseph J. Blackmore, R.R. 2, Edwardsville, Ill., and Perry Gordon Glunt, 91 Wildwood Lane, Kirkwood, Mo.
Filed Jan. 9, 1961, Ser. No. 81,351
2 Claims. (Cl. 55—205)

The present invention relates to the separation of both air and foreign matter from central systems such as hot water heating systems, chilling systems, and fluid systems used for various industrial purposes.

In such circulating water systems it is important that a fairly large portion of air entrapped or entrained in the water, be extracted, more or less continuously. Thus the water in the system will have the capacity to entrap and entrain other air which may be encountered. The extracted air is vented to an expansion tank where its pressure, exerted on the water in the system, compensates for variations in volume due to heating and chilling. Excess air is valved to the atmosphere.

One known method of extracting such air, applicable to heating, chilling and industrial circulating water systems, is to create a vortex within a closed chamber, so that the greater centrifugal force acting on the water and the lesser centrifugal force on the air effects some separation at the vortex center. In one such type of de-aerator, shown in the U.S. Patent to Mayer No. 2,578,568, air bubbles are in effect caught on the mesh of a central vertical tube, and they rise upwardly to a central outlet communicating with an expansion tank and air valve.

We have found that in vortex type de-aerators there is a tendency for the vortex to shift or "wander" about the inside of the chamber, even though the mesh tube somewhat controls its position. If the vortex position is unstabilized and it shifts, twists and wanders, the centrifugal separation and escape of air is impaired and rendered less reliable and effective.

The purposes of the present invention include stabilizing the position of the vortex, and this is done in part by retarding the flow velocity at the lower center of the vortex and causing vertically downward, stabilized vortex flow along the outer wall of the de-aerator chamber.

A further object is to utilize vortex circulation within a closed chamber to strain out fairly small particles of foreign matter, without however involving as high a pressure drop across the strainer as would be the case were the water to flow directly through a strainer of comparable effectivenes.

Still another object is to provide a device which first de-aerates by vortex flow and then uses the vortex circulation for effective straining at a low presure-drop.

A further object is to provide a straining device with a sediment deposit portion and a readily operated clean-out.

These objects, and others which will be apparent from the specification which follows, have been achieved in the present invention. It consists generally in improving on prior art de-aerators of the vortex type by providing a generally circular baffle adjacent to the central axis of the de-aerator chamber at the base of the mesh tube there provided, and by said baffle both to stabilize the vortex position and to retard the flow velocity near the base of the mesh tube, so that the separated air may cling more surely to the mesh and rise to the vent means at the top of the tube. Further, it provides an annular flow passage between the edge of the baffle and the chamber wall, which maintains and continues the vortex circulation. Beneath the flow opening is provided a funnel-like divider with a central flow opening, which drains the de-aerator chamber into a strainer chamber of circular cross section, divided annularly by a cylindrical, smooth-walled, perforated strainer into a central portion and an annular portion. The vortex flow downward from the de-aerator chamber is introduced into the central portion; and the vorticity continues as the water flows around and out through the strainer. The tangential component of its flow is substantial; particles of sediment actually smaller than the perforations in the strainer tend to deflect off the perforations and settle downward, for subsequent clean-out. Larger particles will of course lodge against the perforations; but these may be rolled or washed free by the tangential flow component, and settle down for clean-out. The relatively large perforations, which the present construction makes possible, minimize the loss of pressure due to straining. A substantial increase in pressure drop over this minimum indicates that the strainer should be cleaned.

Figure 1:
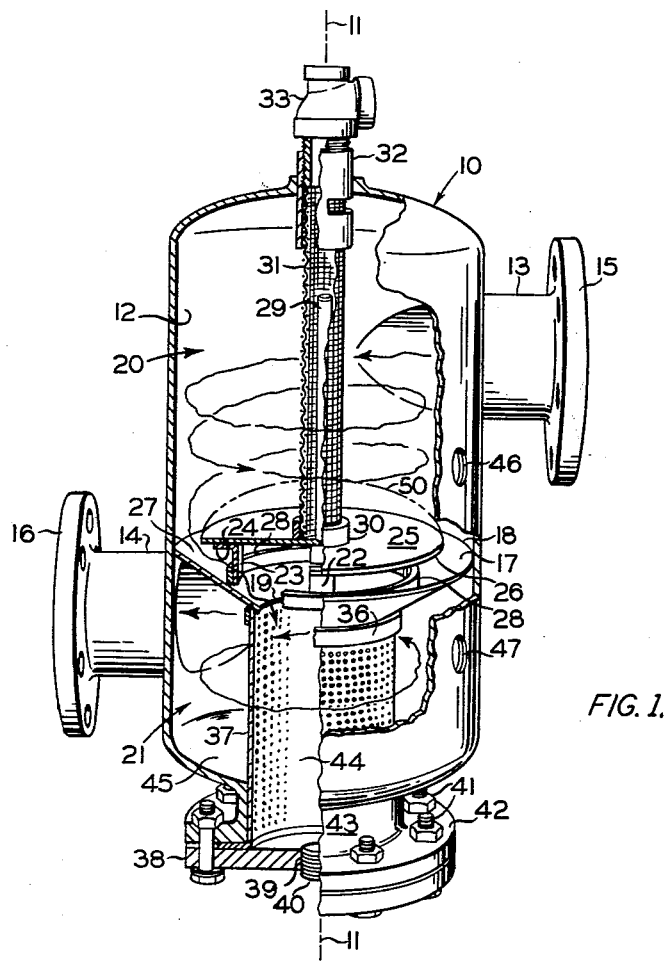
FIGURE 1 is a perspective cut-away view of a combined de-aerator and strainer embodying the present invention.

Referring to the drawings by detail parts numbers, there is shown a hollow, cylindrical closed-end body generally designated 10, preferably of welded steel construction and having a vertical axis 11. The inner wall 12 of the body 10 is smooth; water flowing into the upper portion of the body 10 through its tangential flow inlet 13 will circulate in a vortex pattern as shown by the arrows, moving downward, and finally flow downward through the lower annular flow passage 27. Upper and lower mounting flanges 15, 16 are provided on the flow inlet 13 and flow outlet 14, respectively.

An inverted truncated conical divider 17, whose outer edge 18 is welded, fluid-tight, to the inner wall 12, divides the body 10 into an upper chamber, hereafter called the de-aerator chamber 20, and a lower chamber, hereafter called the strainer chamber 21. The lower inner circular edge 19 of the divider 17 serves as a central flow opening communicating between the chambers 20, 21. As with a classic "free vortex," the radially inward component of flow along the upper, funnel-like surface of the divider 17 and to said central flow opening provides the motive power for vortex circulation.

Erected on the upper surface of the divider 17 and extending tangentially along a circular line between the outer edge 18 and the inner edge 19, are the relatively flat leg portions 22 of a plurality of support angles 23, whose upper portions 24 extend horizontally to support a flat disc-like horizontal baffle 25. The circumferential edge 26 of the horizontal baffle disc 25 is spaced substantially inward from the inner wall 12, leaving an annular flow passage 27 from the de-aerator chamber 20 past the baffle 25 to the divider 17. The lower ends of the leg portions 22 are welded to a ring 28, itself secured to the upper surface of the divider 17. Since the leg portions 22 are tangential, as is the ring 28, these elements serve as tangential flow baffle elements, assuring the continuance of vortex flow over the upper surface of the divider 17 and downward and inward to the central flow opening defined by the edge 19.

Figure 2:
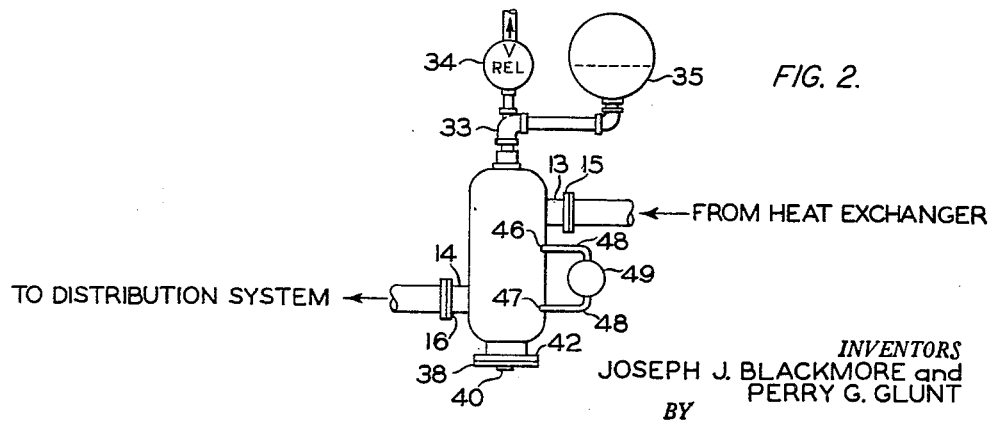
FIGURE 2 is a schematic view showing the connections of the de-aerator and strainer of FIGURE 1 within a typical central water system, as in a heating installation.

A guide rod 29 is welded vertically erect at the center of the baffle 25, reaching upward the greater part of the distance to the top of the body 10. Concentric with the guide rod 29 and spaced slightly outward therefrom is a short cylindrical flange 30, within which is mounted a vertical wire mesh tube 31, which extends therefrom around the rod 29 to top center of the body 10 where it is received within a line coupling 32, to which a T 33 is secured. Referring to FIGURE 2, the T has connections both to an air vent valve 34 and an expansion tank 35 whose functions are hereinafter more fully described.

Beneath and adjacent to the divider lower inner edge 19 is secured a strainer guide ring 36, into which is inserted the upper edge of a cylindrical perforated stainless steel sheet metal strainer 37, whose lower edge is supported by a bottom cover plate 38 having a central coupling opening 39 closed by a drain plug 40. The outer edge of the cover plate 38 is secured by bolts 41 to a horizontal flange 42 on a short cylindrical extension portion 43 of the body 10. The cylindrical portion 43 serves as the lower guide for the strainer 37.

Since the diameter of the strainer 37 is at least equal to the opening provided by the inner edge 19 of the divider 17, the strainer 37 serves to subdivide the strainer chamber 21 into a central inlet portion designated 44 and an annular outlet portion designated 45. The cover plate 38, removable by removing the bolts 41, serves as the principal clean-out provision for the strainer chamber inlet portion 44; although a preliminary "blow-out" and check of the need for clean-out may be made by removing the drain plug 40. The flow outlet 14 from the chamber outlet portion 45 is located well above the level of this clean-out provision; therefore, below the flow outlet 14 the flow will be somewhat slower, a factor which facilitates the deposit of sediment.

Both above and below the outer edge 18 of the divider 17, tapped apertures are provided in the wall of the body 10 to serve as gauge connections; these are the upper gauge connection 46 and the lower gauge connection 47. Tubing 48 connects these to a differential pressure gauge 49 which signals the pressure drop across the strainer 37. Assuming that the strainer 37 is clean, the pressure drop signalled will be a known, safe value. Indication on the gauge 49 of an excess pressure drop signals a need for cleaning the strainer 37. In lieu of the gauge 49, any signaller responsive to excess pressure differential may be employed.

In operation, water flowing from the heat exchanger under pressure of a pump, not shown, enters through the flow inlet 13, whose tangential placement causes the water to swirl in a vortex about the inner wall 12 of the body 10, as it passes generally downward. The centrifugal force acting upon the water molecules is so much greater than that on the entrapped or entrained air, that the air tends to separate, gather at the center of the vortex flow, and cling to the mesh tube 31. Bubbles of air then pass centrally upward in the mesh tube, while the water from which the air has been so separated, continues to descend in a vortex.

We have found that it adds greatly to the efficiency of de-aeration if the vortex flow pattern does not wander about within the body 10 but continues along the inner wall 12, while the velocity at the center of the body 10 is reduced so the heavier concentration of air-in-water near the center can readily escape as air bubbles to the mesh tube. These functions are greatly aided by the horizontal baffle 25. In the present invention, the annular flow passage 27 provided by the baffle 25 assures that the vortex will not wander, but will descend along the outer wall 12 so that centrifugal separation continues efficiently. Further, the flat upper surface of the baffle 25 provides a somewhat dome-shaped region of relatively dead water 50, as shown in FIGURE 1. From the water in this region, air escapes more readily to the base of the mesh tube 31.

The escaping air makes its way upward through the mesh tube 31 into the T 33 from which it either passes into the expansion tank 35 or to the air vent valve 34. The air vent valve may be one of several types, but is conveniently a simple float-valve in which a drop in water level (due to excess build-up of air in the expansion tank) lowers the water level in the vent valve 34. When the float lowers sufficiently, it vents the valve, permits the excess air to escape, the water level to rise, and the valve to close again. Such vent valves are familiar; therefore, the details of construction of the vent valve 34 are not illustrated.

The downward circulation of water in the vortex pattern, initiated at the flow inlet 13 and continued around the circumferential edge 26 of the disk like baffle 25 and thence downward and inward, has increased the efficiency in the de-aeration chamber 20 to an extent which could not have been predicted. Some preliminary test results indicate an efficiency of de-aeration as high as 90%.

Beneath the baffle 25, the circumferential flow proceeds in a vortex inward, with the leg portions 22 of the angles 23 and the ring 28 serving to continue the circumferential or vortex flow pattern even as the water is brought inward to the opening provided by the lower inner edge 19 of the divider 17. The vortex flow downward continues somewhat tangentially along and through the strainer 37, whose perforations are much larger than would have been required for straight-through flow. We find that the large, closely spaced perforations through the sheet metal stainless steel strainer 37 will deflect from the stream particles smaller in diameter than the perforations themselves, due to the fact that these particles approach the strainer perforations glancingly rather than straight on. Once deflected, these particles tend to drop to the bottom cover plate 38. A much lesser pressure drop will be experienced than if a strainer having smaller openings were used. Low pressure drop is important to the operation of the system, partly because the strainer must not interfere with the vortex flow required for the de-aeration function and partly because the capacity of the pump in the distribution system is likely to be limited by other considerations, and may not permit a large pressure drop across a strainer.

Other modifications in detail design of both the strainer chamber elements and the de-aerator chamber elements will suggest themselves to those familiar with the art, who wish to adapt the system illustrated to the specific engineering needs of a given installation. Accordingly, the present invention is not to be construed narrowly but instead as fully co-extensive with the claims hereof.

We claim:

1. A vortex-type de-aerator for incompressible fluid conducting systems, comprising
   a de-aerator chamber having a vertically extending wall of annular cross-section and a lower inverted frusto-conical baffle joining said annular wall at its outer edge, said frusto-conial baffle sloping from its outer edge to an inner annular edge which establishes a central flow opening through said baffle
   a flow inlet means for tangentially introducing fluid into said de-aerator chamber above the frusto-conical baffle,
   a perforated wire mesh tube mounted within said de-aerator chamber and extending axially upwardly from a level below said flow inlet means substantially the entire height of said de-aerator chamber,
   a top central air vent communicating with said perforated tube, and
   an imperforate circular baffle mounted to the lower end of said perforated tube, said circular baffle being mounted to said tube spacedly above said frusto-conical baffle and extending a distance greater than the radial distance of said inner edge of said frusto-conical baffle and terminating radially inwardly of said chamber wall
   whereby to provide a flow passage through which the fluid circulates downward from the de-aerator chamber and thence inwardly to and through the central flow opening in said frusto-conical baffle in a continuing vortex circulation.

2. A vortex-type de-aerator and strainer apparatus, comprising
   a de-aerator chamber having a vertically extending wall of annular cross-section and a lower inverted frusto-conical baffle joining said annular wall at its outer edge, said frusto-conical baffle sloping from its outer edge to an inner annular edge which establishes a central flow opening through said baffle, a flow inlet means for tangentially introducing fluid into said de-aerator chamber above the conical baffle, a perforated wire mesh tube mounted within said de-aerator chamber and extending axially upward from a level below said flow inlet means substantially the entire height of said de-aerator chamber, a top central air vent communicating with said perforated tube, and an imperforate circular baffle mounted to the lower end of said perforated tube, said circular baffle being mounted to said tube spacedly above said frusto-conical baffle and extending a distance greater than the radial distance of said inner edge of said frusto-conical baffle and terminating radially inwardly of said chamber wall together with a strainer chamber having a wall of annular cross-section contiguous with said de-aerator wall and extending downwardly therefrom, said de-aerator strainer chamber communicating with said chamber through said central flow opening, a perforated strainer of annular cross-section mounted within said strainer chamber, said strainer being mounted concentrically with the axis of said inner annular edge of said frusto-conical baffle and being positioned radially outwardly of said central flow opening and radially inwardly of said strainer chamber wall, whereby said strainer chamber is partitioned into a central inlet portion and an annular outlet portion, and a tangential flow outlet through the strainer chamber wall.

References Cited in the file of this patent
UNITED STATES PATENTS

| | | |
|---|---|---|
| 2,631,728 | Popp | Mar. 17, 1953 |
| 2,692,027 | Ammons | Oct. 19, 1954 |
| 2,710,664 | Blackmore et al. | June 14, 1955 |
| 2,762,451 | McNeil | Sept. 11, 1956 |
| 2,852,091 | Boudreaux et al. | Sept. 16, 1958 |
| 2,981,413 | Fitch | Apr. 25, 1961 |
| 3,061,098 | Brezinski | Oct. 30, 1962 |

OTHER REFERENCES

Kearsey et al.: The Separation of Gases From Liquids by Vortical Flow in a Cylindrical Vessel, in the Industrial Chemist, August 1959, pp. 371–374.